(12) United States Patent
Ohno et al.

(10) Patent No.: US 11,872,864 B2
(45) Date of Patent: Jan. 16, 2024

(54) VEHICLE

(71) Applicant: HONDA MOTOR CO., LTD., Tokyo (JP)

(72) Inventors: Satoshi Ohno, Tokyo (JP); Kazuya Konada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 182 days.

(21) Appl. No.: 17/669,695

(22) Filed: Feb. 11, 2022

(65) Prior Publication Data

US 2022/0305869 A1 Sep. 29, 2022

(30) Foreign Application Priority Data

Mar. 24, 2021 (JP) ................... 2021-049773

(51) Int. Cl.
*B60G 17/0185* (2006.01)
*B60G 17/015* (2006.01)
*B60R 16/03* (2006.01)

(52) U.S. Cl.
CPC ..... *B60G 17/0185* (2013.01); *B60G 17/0157* (2013.01); *B60R 16/03* (2013.01); *B60G 2202/422* (2013.01); *B60G 2600/08* (2013.01); *B60G 2600/73* (2013.01)

(58) Field of Classification Search
None
See application file for complete search history.

(56) References Cited

U.S. PATENT DOCUMENTS

| 5,808,371 | A | * | 9/1998 | Kon'i | B60G 17/0195 |
| | | | | | 307/10.6 |
| 6,020,811 | A | * | 2/2000 | Saito | B60G 17/0195 |
| | | | | | 340/517 |
| 2003/0098211 | A1 | * | 5/2003 | Saito | B60R 16/0315 |
| | | | | | 191/3 |
| 2017/0213518 | A1 | | 7/2017 | Tashiro | |

FOREIGN PATENT DOCUMENTS

| JP | 2005-102844 A | 4/2005 |
| JP | 2012-131395 | 7/2012 |
| JP | 2013-219862 A | 10/2013 |
| JP | 2013-254676 A | 12/2013 |
| JP | 2017-134203 A | 8/2017 |

OTHER PUBLICATIONS

Japanese Office Action dated Nov. 29, 2022 issued in corresponding Japanese application No. 2021-049773; English machine translation included (9 pages).

* cited by examiner

*Primary Examiner* — Jared Fureman
*Assistant Examiner* — Joel Barnett
(74) *Attorney, Agent, or Firm* — Rankin, Hill & Clark LLP (57) ABSTRACT

A vehicle includes a high voltage component such as an electric actuator, an electric suspension control ECU, a battery, a signal line which transmits, to the electric suspension control ECU, a detection signal of a sensor disposed in the electric actuator, a high voltage line which supplies a high voltage from the battery to the electric actuator, and a fixing member which fixes the signal line and the high voltage line to a vehicle body, a length of the signal line from the fixing member to the electric actuator is shorter than a length of the high voltage line from the fixing member to the electric actuator, and the electric suspension control ECU suppresses the supply of the high voltage to the electric actuator, in a case where abnormality occurs in the signal line.

6 Claims, 5 Drawing Sheets

VEHICLE

INCORPORATION BY REFERENCE

The present application claims priority under 35 U.S.C. § 119 to Japanese Patent Application No. 2021-049773 filed on Mar. 24, 2021. The content of the application is incorporated herein by reference in its entirety.

BACKGROUND OF THE INVENTION

Field of the Invention

The present invention relates to a vehicle.

Description of the Related Art

Heretofore, a technology concerning an electric suspension apparatus mounted in a vehicle and driven with a motor has been known.

For example, in an electric suspension apparatus described in Japanese Patent Laid-Open No. 2012-131395, an output voltage (motor drive voltage) of a transformer such as a DC/DC converter which transforms power supplied to a motor of an electric actuator is increased as high as possible in a range of a predetermined voltage (e.g., 48 V) or less, based on laws and regulations.

In an electric suspension apparatus described in Japanese Patent Laid-Open No. 2012-131395, in a case of using a three-phase AC brushless motor, a three-phase AC unit is classified as a high voltage with AC 30 V or more. Also, for ensuring safety of the high voltage during collision of a vehicle, it is necessary to ensure safety of the AC unit, which is not described in Japanese Patent Laid-Open No. 2012-131395.

The present invention is intended to improve safety of a high voltage component of an electric suspension apparatus or the like mounted in a vehicle.

SUMMARY OF THE INVENTION

An aspect of the present invention is a vehicle including a high voltage component, a control device, a power source device, a signal line which transmits, to the control device, a detection signal of a sensor disposed in the high voltage component, a high voltage line which supplies a high voltage from the power source device to the high voltage component, and a fixing member which fixes the signal line and the high voltage line to a vehicle body, a length of the signal line from the fixing member to the high voltage component is shorter than a length of the high voltage line from the fixing member to the high voltage component, and the control device suppresses the supply of the high voltage to the high voltage component, in a case where abnormality occurs in the signal line.

According to another aspect of the present invention, the above vehicle further includes a low voltage line which supplies a low voltage from the power source device to the high voltage component, the fixing member fixes the low voltage line to the vehicle body, a length of the low voltage line from the fixing member to the high voltage component is shorter than a length of the high voltage line from the fixing member to the high voltage component, and the control device suppresses the supply of the high voltage to the high voltage component, in a case where abnormality occurs in the low voltage line.

According to still another aspect of the present invention, in the above vehicle, the high voltage component includes an electric actuator driven with a motor in an electric suspension apparatus.

According to a further aspect of the present invention, in the above vehicle, the sensor includes at least one of a rotation angle sensor which detects a rotation angle of the motor, a stroke sensor which detects a stroke of the electric actuator, and an acceleration sensor which detects an acceleration applied to the electric actuator.

According to a further aspect of the present invention, in the above vehicle, the signal line is disposed in a forward direction of the vehicle body compared with the high voltage line.

According to a still further aspect of the present invention, in the vehicle, the high voltage line is disposed inside the vehicle body compared with the signal line.

According to an aspect of the present invention, safety of a high voltage component of an electric suspension apparatus or the like mounted in a vehicle can be improved.

DETAILED DESCRIPTION OF THE PREFERRED EMBODIMENT

Hereinafter, an embodiment of the present invention will be described with reference to the drawings.

1. Configuration of Electric Suspension Apparatus

Figure 1:
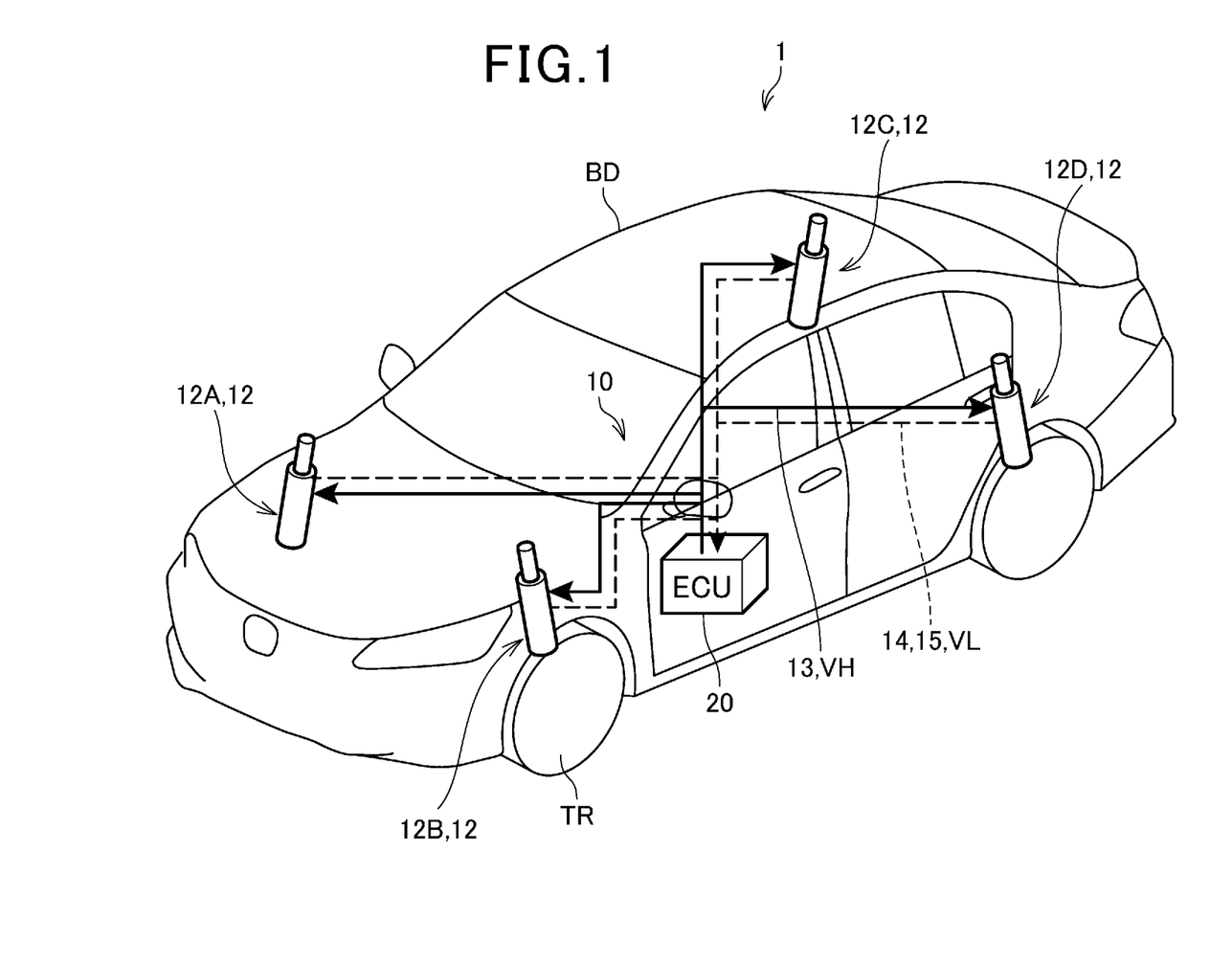
FIG. 1 is a perspective view showing an example of arrangement of an electric suspension apparatus.
Figure 2:
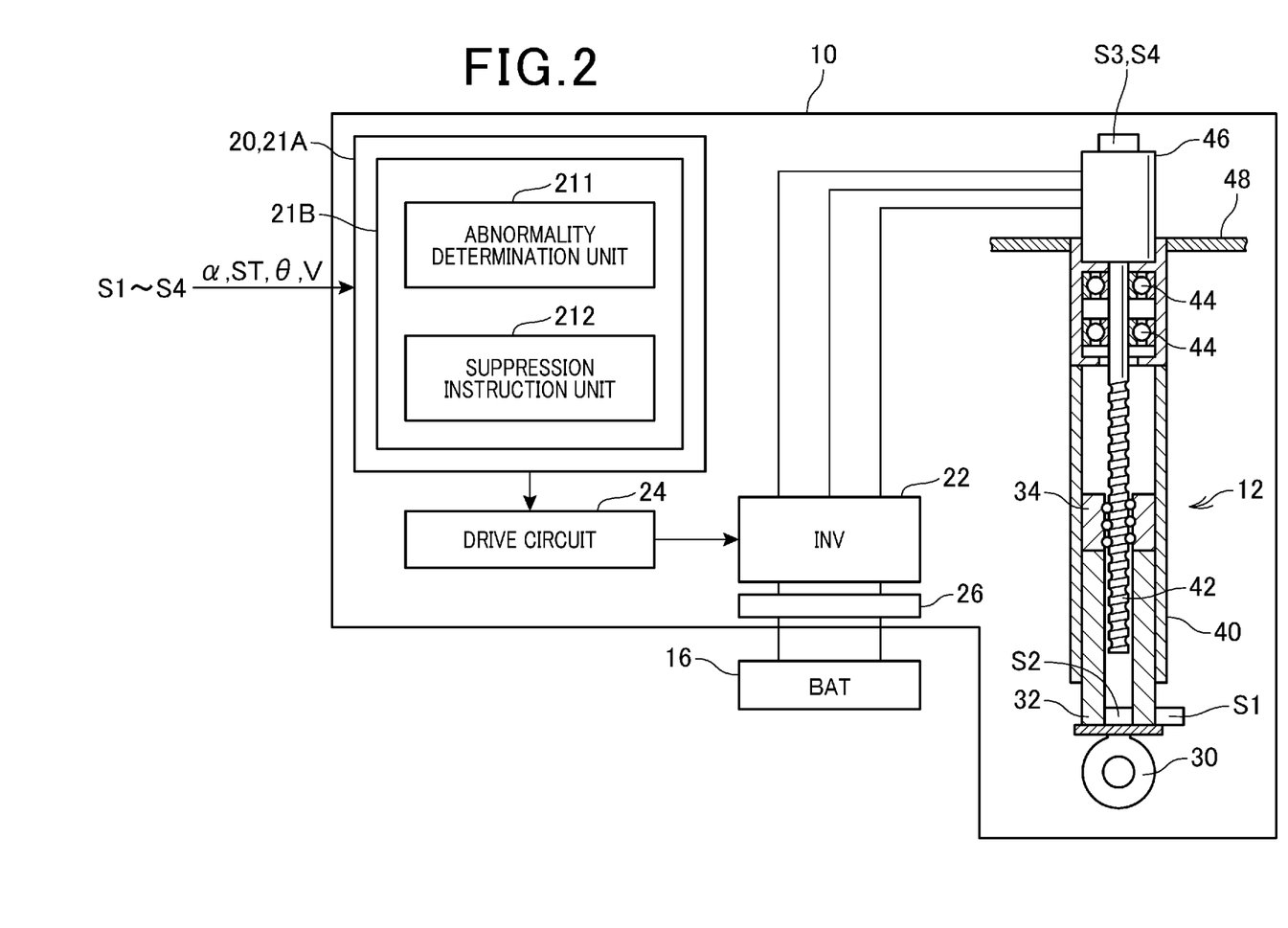
FIG. 2 is a diagram showing an example of a configuration of the electric suspension apparatus.

FIG. 1 is a perspective view showing an example of arrangement of an electric suspension apparatus 10. FIG. 2 is a diagram showing an example of a configuration of the electric suspension apparatus 10.

Description will be made as to the electric suspension apparatus 10 with reference to FIGS. 1 and 2.

As shown in FIG. 1, a vehicle 1 includes a vehicle body BD, four wheels TRs, and the electric suspension apparatus 10. The electric suspension apparatus 10 includes an electric actuator 12, and an electric suspension control ECU 20.

The electric actuator 12 includes a first electric actuator 12A, a second electric actuator 12B, a third electric actuator 12C, and a fourth electric actuator 12D. The first electric actuator 12A is disposed between the vehicle body BD and a right front wheel. The second electric actuator 12B is disposed between the vehicle body BD and a left front wheel. The third electric actuator 12C is disposed between the vehicle body BD and a right rear wheel. The fourth electric actuator 12D is disposed between the vehicle body BD and a left rear wheel.

The electric suspension control electronic control unit (ECU) 20 controls each of the first electric actuator 12A to the fourth electric actuator 12D. The electric suspension control ECU 20 is connected to each of the first electric actuator 12A to the fourth electric actuator 12D via a high voltage line 13, a signal line 14, and a low voltage line 15.

The high voltage line 13 supplies power of a high voltage VH from a battery 16 shown in FIG. 2 to each of the first electric actuator 12A to the fourth electric actuator 12D. The power of the high voltage VH is for use in driving a motor 46 shown in FIG. 2. The high voltage VH is, for example, AC 48 V.

The signal line 14 transmits detection signals of a sensor S1 to a sensor S4 shown in FIG. 2 to the electric suspension control ECU 20.

Description will be made as to the sensor S1 to the sensor S4 with reference to FIG. 2.

The low voltage line 15 supplies power of a low voltage VL from the battery 16 shown in FIG. 2 to each of the first electric actuator 12A to the fourth electric actuator 12D. The power of the low voltage is for use in actuating the sensor S1 to the sensor S4 shown in FIG. 2. The low voltage VL is, for example, DC 5 V.

The battery 16 corresponds to an example of "a power source device".

In the following description, the electric suspension control ECU 20 may be described as the control ECU 20 for convenience.

The first electric actuator 12A to the fourth electric actuator 12D include about the same configuration, and hence in a case where each of the first electric actuator 12A to the fourth electric actuator 12D is not distinguished, each of the first electric actuator 12A to the fourth electric actuator 12D may be described below simply as the electric actuator 12.

Next, description will be made as to a configuration of the electric actuator 12 with reference to FIG. 2.

The electric actuator 12 corresponds to an example of "a high voltage component".

As shown in FIG. 2, the electric actuator 12 includes a coupling part 30, an inner tube 32 and a nut 34 as members on a wheel TR side. Also, the electric actuator 12 includes an outer tube 40, a screw shaft 42, a bearing 44, and the motor 46 as members on a vehicle body BD side. The outer tube 40, the bearing 44 and the motor 46 are fixed to a chassis 48 disposed in a lower part of the vehicle body BD.

Description will be made as to a configuration of the motor 46 with reference to FIG. 3.

The screw shaft 42 is supported by the bearing 44 and the nut 34. The nut 34 has an inner surface screwed into a screw groove formed in an outer surface of the screw shaft 42 via a bearing.

When the motor 46 rotates the screw shaft 42, the nut 34 is moved in an up-down direction. When moving the nut 34 downward, the inner tube 32 is moved downward. When moving the nut 34 upward, the inner tube 32 is moved upward.

Consequently, a position of the inner tube 32 in the up-down direction to the outer tube 40 fixed to the chassis 48 of the vehicle body BD can be adjusted.

The coupling part 30 is fixed to a knuckle (not shown) of the suspension apparatus, and is accordingly coupled to the wheel TR. When inputting vibration from the wheel TR side into the coupling part 30 and applying, for example, an upward acceleration α to the coupling part 30, the inner tube 32 and the nut 34 are raised integrally with the outer tube 40. In this case, the motor 46 rotates the screw shaft 42 to move the inner tube 32 in a direction to absorb the upward acceleration α, i.e., in an upward direction, so that vibration from the wheel TR to the vehicle body BD can be attenuated.

In the electric actuator 12, an acceleration sensor S1, a stroke sensor S2, a rotation angle sensor S3 and a voltage sensor S4 are arranged.

The acceleration sensor S1 is fixed to, for example, an outer circumferential surface of the inner tube 32, to detect the acceleration α applied from the wheel TR side to the coupling part 30.

The stroke sensor S2 is disposed at a position facing the screw shaft 42 of the inner tube 32, to detect a stroke ST indicating a downward moving amount of the nut 34. The stroke sensor S2 is composed of a distance measurement sensor or the like.

The rotation angle sensor S3 is composed of a so-called resolver, Hall element or the like, to detect a rotation angle θ of the motor 46.

The voltage sensor S4 detects a voltage V applied to the motor 46. In a state where the motor 46 is driven with the power from the battery 16, the voltage V indicates the high voltage VH supplied from the battery 16 through the high voltage line 13.

The acceleration α, the stroke ST, the rotation angle θ and the voltage V are outputted to the control ECU 20.

Each of the acceleration sensor S1, the stroke sensor S2, the rotation angle sensor S3 and the voltage sensor S4 corresponds to an example of "a sensor".

2. Configuration of Electric Suspension Control ECU

The control ECU 20 controls the motor 46 through an inverter 22, based on detection results of the acceleration sensor S1, the stroke sensor S2, the rotation angle sensor S3 and the voltage sensor S4.

Description will be made as to a configuration of the inverter 22 with reference to FIG. 3.

The control ECU 20 includes a memory 21A and a processor 21B.

The memory 21A is a storage device which stores, in a nonvolatile manner, a program to be executed by the processor 21B and data. The memory 21A is composed of a magnetic storage device, a semiconductor storage element such as a flash read only memory (ROM), or another type of nonvolatile storage device. Also, the memory 21A may include a random-access memory (RAM) included in a work area of the processor 21B. The memory 21A stores data to be processed by the control ECU 20, and a control program to be executed by the processor 21B.

The electric suspension control ECU 20 corresponds to an example of "a control device".

The processor 21B may be composed of a single processor, or a plurality of processors which function as the processor 21B. The processor 21B executes the control program to control each part of the electric suspension apparatus 10.

The control ECU 20 includes an abnormality determination unit 211 and a suppression instruction unit 212. Specifically, the processor 21B of the control ECU 20 executes a control program, to function as the abnormality determination unit 211 and the suppression instruction unit 212.

The abnormality determination unit 211 determines whether abnormality occurs in the signal line 14. The abnormality determination unit 211 determines that the abnormality occurs in the signal line 14, for example, in a case where a S/N ratio is equal to or less than a predetermined S/N ratio. Also, the abnormality determination unit 211 determines that the abnormality occurs in the signal line 14, for example, in a case where disconnection occurs in the signal line 14.

As will be described with reference to FIG. 4, the signal line 14 includes a first signal line 141 to a fourth signal line 144. The abnormality determination unit 211 determines whether abnormality occurs in one of the first signal line 141 to the fourth signal line 144.

The abnormality determination unit 211 determines whether abnormality occurs in the low voltage line 15. The abnormality determination unit 211 determines that the abnormality occurs in the low voltage line 15, for example, in a case where disconnection occurs in the low voltage line 15.

Depending on determination result of the abnormality determination unit 211, the suppression instruction unit 212 suppresses supply of power of the high voltage VH to the motor 46 of each of the first electric actuator 12A to the fourth electric actuator 12D.

Specifically, in a case where the abnormality determination unit 211 determines that abnormality occurs in at least one of the signal line 14 and the low voltage line 15, the suppression instruction unit 212 executes processing as follows. Specifically, the suppression instruction unit 212, for example, fixes the inverter 22 in an off state to a drive circuit 24, to stop the supply of the power of the high voltage VH to the motor 46.

Description will be made as to the drive circuit 24 and the inverter 22 with reference to FIG. 3.

3. Configuration of Inverter

Figure 3:
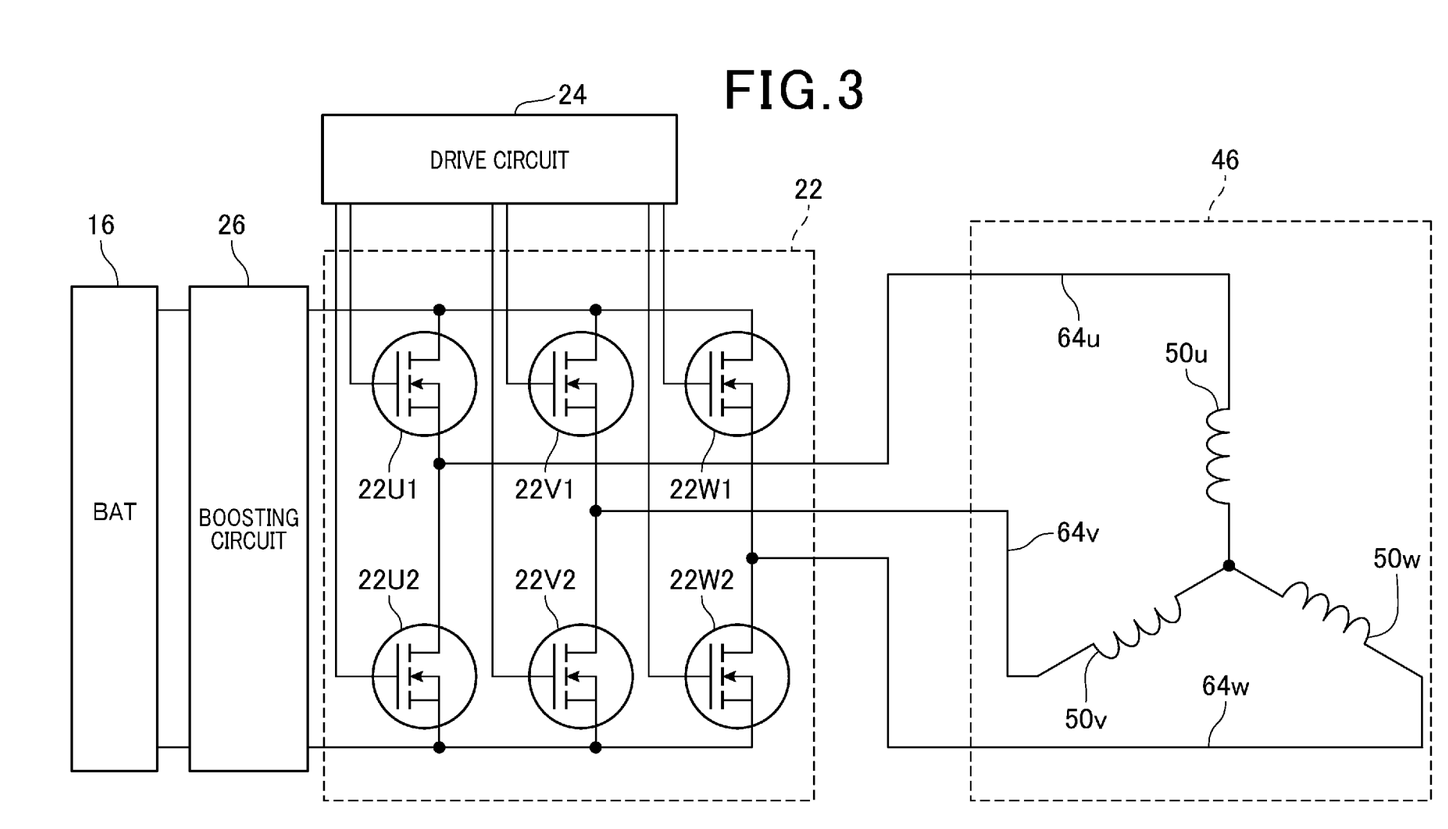
FIG. 3 is a diagram showing an example of a configuration of an inverter.

As shown in FIGS. 2 and 3, the control ECU 20 controls the inverter 22 through the drive circuit 24. The control ECU 20 controls a rotation direction and a rotation speed of the motor 46 through the inverter 22. Also, the control ECU 20 stops the supply of the power of the high voltage VH to the motor 46, for example, by fixing the inverter 22 in the off state. Alternatively, a relay may be provided on a power source line of the inverter 22 and the boosting circuit 26, and the control ECU 20 may stop the supply of the power of the high voltage VH to the motor 46 by cutting off the relay.

FIG. 3 is a diagram showing an example of a configuration of the inverter 22.

The boosting circuit 26 is disposed between the battery 16 and the inverter 22. The boosting circuit 26 boosts a voltage supplied from the battery 16, and supplies power of the high voltage VH to the inverter 22. The voltage supplied from the battery 16 is, for example, 48 V.

As shown in FIG. 3, the inverter 22 includes a metal-oxide-semiconductor field effect transistor (MOSFET) 22U1, a MOSFET 22U2, a MOSFET 22V1, a MOSFET 22V2, a MOSFET 22W1, and a MOSFET 22W2. Each of these six MOSFETs turns on and off based on an instruction from the control ECU 20.

The motor 46 is, for example, a three-phase AC brushless motor, and includes three motor coils 50u, 50v, and 50w as shown in FIG. 3.

The motor 46 rotationally drives the screw shaft 42 shown in FIG. 2 with the power supplied from the battery 16 through the inverter 22.

For example, upon receiving an instruction to stop supply of the high voltage VH to the motor 46 from the suppression instruction unit 212, the drive circuit 24 fixes, in an off state, three MOSFETs on a plus side, that is, the MOSFET 22U1, the MOSFET 22V1 and the MOSFET 22W1. By fixing the MOSFET 22U1, the MOSFET 22V1, and the MOSFET 22W1 in the off state, power lines 64u, 64v, and 64w are released from the boosting circuit 26. As a result, application of the high voltage VH to the motor coils 50u, 50v, and 50w of the motor 46 is stopped.

4. Wiring Structure

Next, description will be made as to a wiring structure with reference to FIG. 4.

Figure 4:
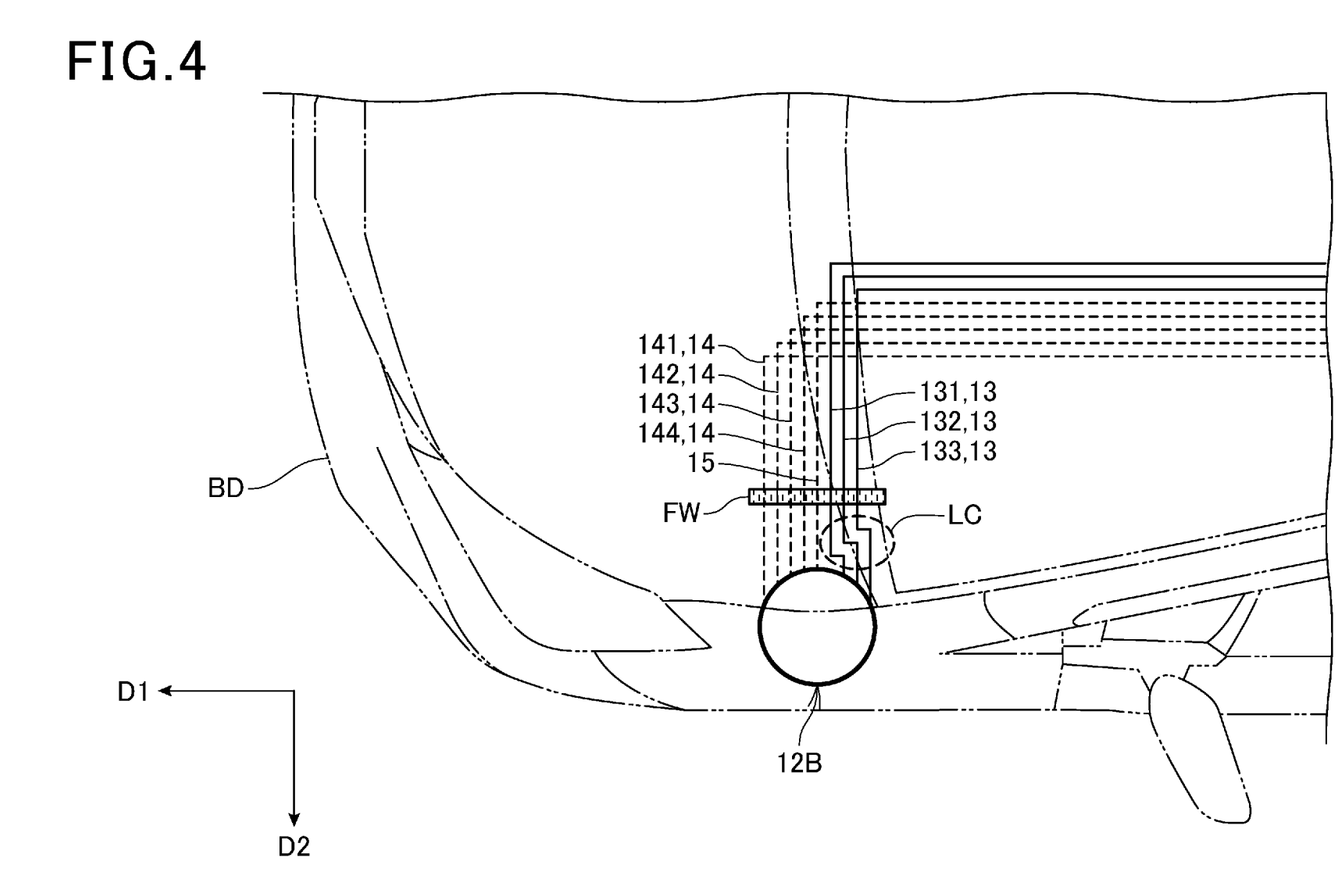
FIG. 4 is a plan view showing an example of a wiring structure of a high voltage line, a signal line, and a low voltage line.

FIG. 4 is a plan view showing an example of the wiring structure of the high voltage line 13, the signal line 14, and the low voltage line 15. FIG. 4 depicts a front left part of the vehicle body BD, and description will be made as to the second electric actuator 12B as an example of the first electric actuator 12A to the fourth electric actuator 12D.

A direction D1 indicates a front-rear direction of the vehicle body BD. A positive direction of the direction D1 indicates a forward direction of the vehicle body BD. A direction D2 indicates a left-right direction of the vehicle body BD. A positive direction of the direction D2 indicates a leftward direction of the vehicle body BD.

As shown in FIG. 4, the signal line 14 is composed of the first signal line 141, a second signal line 142, a third signal line 143, and the fourth signal line 144.

The first signal line 141 transmits a signal indicating the acceleration α detected by the acceleration sensor S1 to the control ECU 20. The second signal line 142 transmits a signal indicating the stroke ST detected by the stroke sensor S2 to the control ECU 20. The third signal line 143 transmits, to the control ECU 20, a signal indicating the rotation angle θ of the motor 46 which is detected by the rotation angle sensor S3. The fourth signal line 144 detects the voltage V applied to the motor 46 and detected by the voltage sensor S4.

As shown in FIG. 4, each of the first signal line 141 to the fourth signal line 144 extends from the second electric actuator 12B to the right of the vehicle body BD (in a negative direction of the direction D2), and extends to the rear of the vehicle body BD (in a negative direction of the direction D1) in front of a center line of the vehicle body BD.

The low voltage line 15 is disposed along the signal line 14.

In a region where the signal line 14 extends to the right of the vehicle body BD (in the negative direction of the direction D2), the first signal line 141, the second signal line 142, the third signal line 143, the fourth signal line 144 and the low voltage line 15 are arranged in this order toward the rear of the vehicle body BD (in the negative direction of the direction D1).

Also, in a region where the signal line 14 extends to the rear of the vehicle body BD (in the negative direction of the direction D1), the first signal line 141, the second signal line 142, the third signal line 143, the fourth signal line 144 and the low voltage line 15 are arranged in this order toward the right of the vehicle body BD (in the negative direction of the direction D2).

The high voltage line 13 is composed of a first high voltage line 131, a second high voltage line 132, and a third high voltage line 133. The first high voltage line 131 is connected to the power line 64u shown in FIG. 3. The second high voltage line 132 is connected to the power line 64v shown in FIG. 3. The third high voltage line 133 is connected to the power line 64w shown in FIG. 3.

As shown in FIG. 4, each of the first high voltage line 131 to the third high voltage line 133 extends from the second electric actuator 12B to the right of the vehicle body BD (in the negative direction of the direction D2), and extends to the rear of the vehicle body BD (in the negative direction of the direction D1) in front of the center line of the vehicle body BD.

In a region where the high voltage line 13 extends to the right of the vehicle body BD (in the negative direction of the direction D2), the first high voltage line 131, the second high voltage line 132 and the third high voltage line 133 are arranged in this order toward the rear of the vehicle body BD (in the negative direction of the direction D1).

Note that in the region where the high voltage line 13 extends to the right of the vehicle body BD (in the negative direction of the direction D2), the first signal line 141 to the fourth signal line 144 and the low voltage line 15 are arranged in a forward direction of the vehicle body BD (in the positive direction of the direction D1) compared with the first high voltage line 131 to the third high voltage line 133. In other words, the signal line 14 and the low voltage line 15 are arranged in the forward direction of the vehicle body BD compared with the high voltage line 13.

Also, in a region where the high voltage line 13 extends to the rear of the vehicle body BD (in the negative direction of the direction D1), the first high voltage line 131, the second high voltage line 132 and the third high voltage line 133 are arranged in this order toward the left of the vehicle body BD (in the positive direction of the direction D2).

Note that in the region extending to the rear of the vehicle body BD (in the negative direction of the direction D1), the first high voltage line 131, the second high voltage line 132 and the third high voltage line 133 are arranged on the right of the vehicle body BD (in the negative direction of the direction D2) compared with the first signal line 141 to the fourth signal line 144 and the low voltage line 15. In other words, the high voltage line 13 is disposed inside the vehicle body BD compared with the signal line 14 and the low voltage line 15.

Further, in a region where the high voltage line 13, the signal line 14 and the low voltage line 15 extend to the right of the vehicle body BD (in the negative direction of the direction D2), a fixing member FW is disposed. The fixing member FW fixes the high voltage line 13, the signal line 14, and the low voltage line 15 to the vehicle body BD, which is, for example, a cable clip.

Between the fixing member FW and the second electric actuator 12B, a bent part LC is formed in each of the first high voltage line 131 to the third high voltage line 133. In the bent part LC, each of the first high voltage line 131 to the third high voltage line 133 is bent and disposed.

In other words, the high voltage line 13, the signal line 14 and the low voltage line 15 are arranged in the vehicle body BD in such a manner that a length of each of the signal line 14 and the low voltage line 15 from the fixing member FW to the second electric actuator 12B is shorter than a length of the high voltage line 13 from the fixing member FW to the second electric actuator 12B.

As described with reference to FIG. 4, the high voltage line 13, the signal line 14 and the low voltage line 15 are arranged in the vehicle body BD in such a manner that the length of each of the signal line 14 and the low voltage line 15 from the fixing member FW to the second electric actuator 12B is shorter than the length of the high voltage line 13 from the fixing member FW to the second electric actuator 12B. Therefore, each of the signal line 14 and the low voltage line 15 is easier to disconnect than the high voltage line 13. Then, in a case where the abnormality determination unit 211 detects disconnection of at least one of the signal line 14 and the low voltage line 15, the suppression instruction unit 212 can stop the supply of the power of the high voltage VH to the motor 46 of each of the first electric actuator 12A to the fourth electric actuator 12D.

Also, as described with reference to FIG. 4, the signal line 14 and the low voltage line 15 are arranged in the forward direction of the vehicle body BD compared with the high voltage line 13, and hence in a case where a front part of the vehicle body BD collides with another vehicle or the like, the signal line 14 and the low voltage line 15 disconnect before the high voltage line 13. Then, in a case where the abnormality determination unit 211 detects the disconnection of at least one of the signal line 14 and the low voltage line 15, the suppression instruction unit 212 can stop the supply of the power of the high voltage VH to the motor 46 of each of the first electric actuator 12A to the fourth electric actuator 12D. Therefore, safety of the electric suspension apparatus 10 can be improved.

Also, as described with reference to FIG. 4, the signal line 14 and the low voltage line 15 are arranged inside the vehicle body BD compared with the high voltage line 13, and hence in a case where a left part of the vehicle body BD collides with the other vehicle or the like, the signal line 14 and the low voltage line 15 disconnect before the high voltage line 13. Then, in a case where the abnormality determination unit 211 detects the disconnection in at least one of the signal line 14 and the low voltage line 15, the suppression instruction unit 212 can stop the supply of the power of the high voltage VH to the motor 46 of each of the first electric actuator 12A to the fourth electric actuator 12D. Therefore, the safety of the electric suspension apparatus 10 can be improved.

5. Processing of Control ECU

Figure 5:
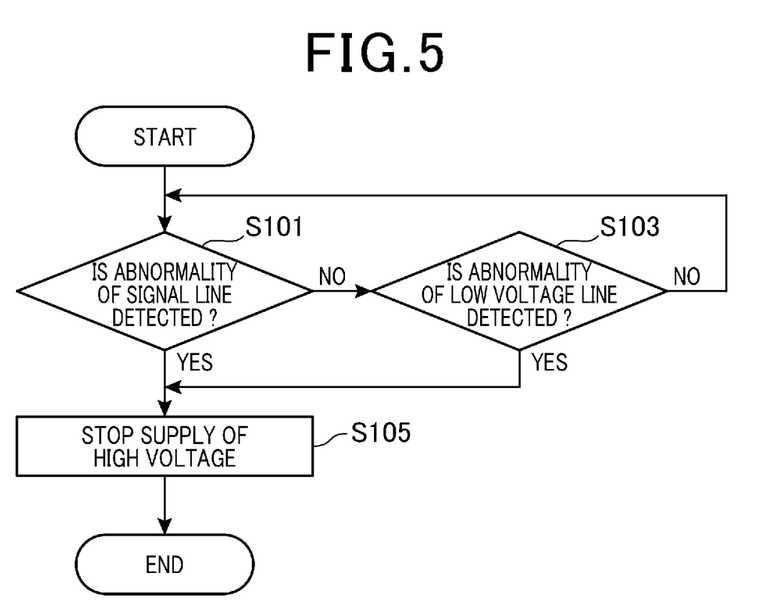
FIG. 5 is a flowchart showing an example of processing of a control ECU.

FIG. 5 is a flowchart showing an example of processing of the electric suspension control ECU 20.

First, in step S101, the abnormality determination unit 211 determines whether abnormality occurs in the signal line 14. The abnormality determination unit 211 determines, for example, whether the signal line 14 disconnects.

In a case where the abnormality determination unit 211 determines that the abnormality occurs in the signal line 14 (YES in step S101), the processing advances to step S105. In a case where the abnormality determination unit 211 determines that the abnormality does not occur in the signal line 14 (NO in step S101), the processing advances to step S103.

Then, in the step S103, the abnormality determination unit 211 determines whether abnormality occurs in the low voltage line 15. The abnormality determination unit 211 determines, for example, whether the low voltage line 15 disconnects.

In a case where the abnormality determination unit 211 determines that the abnormality does not occur in the low voltage line 15 (NO in step S103), the processing returns to the step S101. In a case where the abnormality determination unit 211 determines that the abnormality occurs in the low voltage line 15 (YES in step S103), the processing advances to the step S105.

Then, in the step S105, the suppression instruction unit 212 suppresses the supply of the power of the high voltage VH to the motor 46 of each of the first electric actuator 12A to the fourth electric actuator 12D. For example, the suppression instruction unit 212 stops the supply of the power of the high voltage VH to the motor 46 of each of the first electric actuator 12A to the fourth electric actuator 12D. Afterward, the processing ends.

As described with reference to FIG. 5, in a case where the abnormality occurs in at least one of the signal line 14 and the low voltage line 15, the suppression instruction unit suppresses the supply of the power of the high voltage VH to the motor 46 of each of the first electric actuator 12A to the fourth electric actuator 12D. Consequently, the safety of the electric suspension apparatus 10 can be improved.

6. Configurations and Effects

As described above, a vehicle 1 according to the present embodiment includes a high voltage component such as an electric actuator 12, an electric suspension control ECU 20, a battery 16, a signal line 14 which transmits, to the electric suspension control ECU 20, a detection signal of a sensor disposed in the electric actuator 12, a high voltage line 13 which supplies a high voltage VH from the battery 16 to the high voltage component (electric actuator 12), and a fixing member FW which fixes the signal line 14 and the high voltage line 13 to a vehicle body BD, a length of the signal line 14 from the fixing member FW to the high voltage component (electric actuator 12) is shorter than a length of the high voltage line 13 from the fixing member FW to the high voltage component (electric actuator 12), and the electric suspension control ECU 20 suppresses the supply of the high voltage VH to the high voltage component (electric actuator 12), in a case where abnormality occurs in the signal line 14.

According to this configuration, the length of the signal line 14 from the fixing member FW to the high voltage component (electric actuator 12) is shorter than the length of the high voltage line 13 from the fixing member FW to the high voltage component (electric actuator 12), and hence the signal line 14 is easier to disconnect than the high voltage line 13. Also, the electric suspension control ECU 20 suppresses the supply of the high voltage VH to the high voltage component (electric actuator 12), in the case where the abnormality occurs in the signal line 14, so that safety of the high voltage component (electric actuator 12) can be improved.

Also, the vehicle further includes a low voltage line 15 which supplies a low voltage VL from the battery 16 to the high voltage component (electric actuator 12), the fixing member FW fixes the low voltage line 15 to the vehicle body BD, a length of the low voltage line 15 from the fixing member FW to the high voltage component (electric actuator 12) is shorter than a length of the high voltage line 13 from the fixing member FW to the high voltage component (electric actuator 12), and the electric suspension control ECU 20 suppresses the supply of the high voltage VH to the high voltage component (electric actuator 12), in the case where abnormality occurs in the low voltage line 15.

According to this configuration, the length of the low voltage line 15 from the fixing member FW to the high voltage component (electric actuator 12) is shorter than the length of the high voltage line 13 from the fixing member FW to the high voltage component (electric actuator 12), and hence the low voltage line 15 is easier to disconnect than the high voltage line 13. Also, the electric suspension control ECU 20 suppresses the supply of the high voltage VH to the high voltage component (electric actuator 12), in a case where the abnormality occurs in the low voltage line 15, so that the safety of the high voltage component (electric actuator 12) can be improved.

Also, the high voltage component includes an electric actuator 12 driven with a motor 46 in an electric suspension apparatus 10.

According to this configuration, the supply of the high voltage VH to the electric actuator 12 is suppressed, so that safety of the electric actuator 12 can be improved.

Further, the sensor includes at least one of a rotation angle sensor S3 which detects a rotation angle $\theta$ of the motor 46, a stroke sensor S2 which detects a stroke ST of the electric actuator 12, and an acceleration sensor S1 which detects an acceleration $\alpha$ applied to the electric actuator 12.

According to this configuration, the signal line 14 transmits, to the electric suspension control ECU 20, a detection signal of at least one sensor of the rotation angle sensor S3, the stroke sensor S2 and the acceleration sensor S1. Therefore, in a case where abnormality occurs in the signal line 14, the supply of the high voltage VH to the electric actuator 12 is suppressed, so that the safety of the electric actuator 12 can be improved.

Also, the signal line 14 is disposed in a forward direction of the vehicle body BD compared with the high voltage line 13, as shown in FIG. 4.

Therefore, for example, in a case where a front part of the vehicle body BD collides with another vehicle or the like, the signal line 14 disconnects before the high voltage line 13. Then, in a case where the disconnection of the signal line 14 is detected, the supply of the power of the high voltage VH to the electric actuator 12 can be stopped. Therefore, safety of the electric suspension apparatus 10 can be improved.

Further, the high voltage line 13 is disposed inside the vehicle body BD compared with the signal line 14 as shown in FIG. 4.

Therefore, for example, in a case where a left part of the vehicle body BD collides with the other vehicle or the like, the signal line 14 disconnects before the high voltage line 13. Then, in a case where the disconnection of the signal line 14 is detected, the supply of the high voltage VH to the electric actuator 12 can be stopped. Therefore, the safety of the electric suspension apparatus 10 can be improved.

7. Another Embodiment

Note that the present invention is not limited to the above configuration of the embodiment, and the invention can be implemented in various aspects without departing from the scope of the invention.

For example, the above embodiment describes, but is not limited to the case where "the high voltage component" is the electric actuator 12. "The high voltage component" may be, for example, one of an in-wheel motor, an air conditioner, a running motor, and an electric stabilizer.

Also, the above embodiment describes, but is not limited to the case where "the power source device" is the battery 16. "The power source device" may be a power generator such as an alternator.

Additionally, the above embodiment describes, but is not limited to the case where the electric suspension apparatus 10 includes the first electric actuator 12A to the fourth electric actuator 12D. For example, the electric suspension apparatus 10 may include the third electric actuator 12C and the fourth electric actuator 12D, and the apparatus does not have to include the first electric actuator 12A and the second electric actuator 12B. Conversely, the electric suspension apparatus 10 may include the first electric actuator 12A and the second electric actuator 12B, and the apparatus does not have to include the third electric actuator 12C and the fourth electric actuator 12D.

Further, the above embodiment describes, but is not limited to the case where the suppression instruction unit 212 fixes the inverter 22 in the off state, to release the motor 46. For example, the electric suspension apparatus 10 may include a release circuit which releases the motor 46, and the suppression instruction unit 212 may release the motor 46 through the release circuit. Alternatively, a relay may be provided on a power source line of the inverter 22 and the boosting circuit 26, and the suppression instruction unit 212 may stop the power supply to the motor 46 by cutting off the relay.

At least part of the respective functional blocks shown in FIG. 2 may be achieved in hardware, or in hardware and software, and is not limited to a configuration to arrange independent hardware resources as shown in the drawing.

The control program executed by the processor 21B of the electric suspension control ECU 20 of the electric suspension apparatus 10 is stored in the memory 21A, but the control program may be stored in an external HDD or the like.

The processing units shown in the flowchart of FIG. 5 are divided depending on main processing content, to facilitate understanding of the processing of the electric suspension control ECU 20 of the electric suspension apparatus 10. The embodiment is not limited by a dividing method or name of the processing unit shown in the flowchart of FIG. 5. The processing of the electric suspension control ECU 20 may be divided into much more processing units depending on processing content, and one processing unit may be divided to include further processing. The above processing order in the flowchart is not limited to the shown example.

A control method of the electric suspension control ECU 20 can be achieved by allowing the processor 21B of the electric suspension control ECU 20 to execute a control program corresponding to the control method of the electric suspension control ECU 20. The control program can be recorded in advance in a computer readable recording medium. As the recording medium, a magnetic or optical recording medium or a semiconductor memory device may be used. Specifically, examples of the recording medium include a portable recording medium such as a flexible disk, a compact disk read only memory (CD-ROM), a digital versatile disc (DVD), Blue-ray (registered trademark) disc, a magneto-optic disk, a flash memory, or a card recording medium, and a fixed recording medium. The recording medium may be a nonvolatile storage device such as RAM, ROM, HDD, or another internal storage device included in the electric suspension apparatus 10. The control method of the electric suspension control ECU 20 may be achieved by storing the control program corresponding to the control method of the electric suspension control ECU 20 in a server device or the like, and by downloading the control program from the server device to the electric suspension control ECU 20.

8. Configurations Supported by the Above Embodiment

The above embodiment supports the following configurations.

(Configuration 1)

A vehicle including a high voltage component, a control device, a power source device, a signal line which transmits, to the control device, a detection signal of a sensor disposed in the high voltage component, a high voltage line which supplies a high voltage from the power source device to the high voltage component, and a fixing member which fixes the signal line and the high voltage line to a vehicle body, wherein a length of the signal line from the fixing member to the high voltage component is shorter than a length of the high voltage line from the fixing member to the high voltage component, and the control device suppresses the supply of the high voltage to the high voltage component, in a case where abnormality occurs in the signal line.

According to the vehicle of configuration 1, the length of the signal line from the fixing member to the high voltage component is shorter than the length of the high voltage line from the fixing member to the high voltage component, and hence the signal line is easier to disconnect than the high voltage line. Also, the control device suppresses the supply of the high voltage to the high voltage component, in the case where the abnormality occurs in the signal line, so that safety of the high voltage component can be improved.

(Configuration 2)

The vehicle according to configuration 1 further includes a low voltage line which supplies a low voltage from the power source device to the high voltage component, wherein the fixing member fixes the low voltage line to the vehicle body, a length of the low voltage line from the fixing member to the high voltage component is shorter than a length of the high voltage line from the fixing member to the high voltage component, and the control device suppresses the supply of the high voltage to the high voltage component, in a case where abnormality occurs in the low voltage line.

According to the vehicle of configuration 2, the length of the low voltage line from the fixing member to the high voltage component is shorter than the length of the high voltage line from the fixing member to the high voltage component, and hence the low voltage line is easier to disconnect than the high voltage line. Also, the control device suppresses the supply of the high voltage to the high voltage component, in the case where the abnormality occurs in the low voltage line, so that the safety of the high voltage component can be improved.

(Configuration 3)

The vehicle according to configuration 1 or 2, wherein the high voltage component includes an electric actuator driven with a motor in an electric suspension apparatus.

According to the vehicle of configuration 3, the supply of the high voltage to the electric actuator is suppressed, so that safety of the electric actuator can be improved.

(Configuration 4)

The vehicle of configuration 3, wherein the sensor includes at least one of a rotation angle sensor which detects a rotation angle of the motor, a stroke sensor which detects a stroke of the electric actuator, and an acceleration sensor which detects an acceleration applied to the electric actuator.

According to the vehicle of configuration 4, the signal line transmits, to control device, a detection signal of at least one sensor of the rotation angle sensor, the stroke sensor, and the acceleration sensor. Therefore, in a case where abnormality occurs in the signal line, the supply of the high voltage to the electric actuator is suppressed, so that the safety of the electric actuator can be improved.

(Configuration 5)

The vehicle according to any one of configurations 1 to 4, wherein the signal line is disposed in a forward direction of the vehicle body compared with the high voltage line.

According to the vehicle of configuration 5, for example, in a case where a left part of the vehicle body collides with another vehicle or the like, the signal line disconnects before the high voltage line. Then, in a case where the disconnection of the signal line is detected, the supply of the high voltage to the high voltage component is suppressed, so that safety of the high voltage component can be improved.

(Configuration 6)

The vehicle according to any one of configurations 1 to 5, wherein the high voltage line is disposed inside the vehicle body compared with the signal line.

According to the vehicle of configuration 6, for example, in a case where the left part of the vehicle body collides with the other vehicle or the like, the signal line disconnects before the high voltage line. Then, in a case where the disconnection of the signal line is detected, the supply of the high voltage to the high voltage component can be suppressed, so that the safety of the high voltage component can be improved.

REFERENCE SIGNS LIST

1 . . . vehicle, 10 . . . electric suspension apparatus, 12 . . . electric actuator (high voltage component), 12A . . . first electric actuator, 12B . . . second electric actuator, 12C . . . third electric actuator, 12D . . . fourth electric actuator, 13 . . . high voltage line, 131 first high voltage line, 132 second high voltage line, 133 third high voltage line, 14 . . . signal line, 141 first signal line, 142 second signal line, 143 third signal line, 144 fourth signal line, 211 abnormality determination unit, 212 suppression instruction unit, 15 . . . low voltage line, 16 . . . battery (power source device), 20 . . . electric suspension control ECU (control device), 21A . . . memory, 21B . . . processor, 211 . . . voltage determination unit, 212 . . . short circuit instruction unit, 22 . . . inverter, 22U1, 22U2, 22V1, 22V2, 22W1 and 22W2 . . . MOSFET, 30 . . . coupling part, 32 . . . inner tube, 34 . . . nut, 40 . . . outer tube, 42 . . . screw shaft, 44 . . . bearing, 46 . . . motor, 50*u*, 50*v* and 50*w* . . . motor coil, 64*u*, 64*v* and 64*w* . . . power line, BD . . . vehicle body, S1 . . . acceleration sensor (sensor), S2 . . . stroke sensor (sensor), S3 . . . rotation angle sensor (sensor), S4 . . . voltage sensor, ST . . . stroke, TR . . . wheel, V . . . voltage, α . . . acceleration, θ . . . rotation angle

What is claimed is:

1. A vehicle comprising:

a high voltage component, a control device, a power source device, a signal line which transmits, to the control device, a detection signal of a sensor disposed in the high voltage component, a high voltage line which supplies a high voltage from the power source device to the high voltage component, and a fixing member which fixes the signal line and the high voltage line to a vehicle body, wherein a length of the signal line from the fixing member to the high voltage component is shorter than a length of the high voltage line from the fixing member to the high voltage component, and the control device suppresses the supply of the high voltage to the high voltage component, in a case where abnormality occurs in the signal line.

2. The vehicle according to claim 1, further comprising:

a low voltage line which supplies a low voltage from the power source device to the high voltage component, wherein the fixing member fixes the low voltage line to the vehicle body, a length of the low voltage line from the fixing member to the high voltage component is shorter than a length of the high voltage line from the fixing member to the high voltage component, and the control device suppresses the supply of the high voltage to the high voltage component, in a case where abnormality occurs in the low voltage line.

3. The vehicle according to claim 1, wherein the high voltage component includes an electric actuator driven with a motor in an electric suspension apparatus.

4. The vehicle according to claim 3, wherein the sensor includes at least one of a rotation angle sensor which detects a rotation angle of the motor, a stroke sensor which detects a stroke of the electric actuator, and an acceleration sensor which detects an acceleration applied to the electric actuator.

5. The vehicle according to claim 1, wherein the signal line is disposed in a forward direction of the vehicle body compared with the high voltage line.

6. The vehicle according to claim 1, wherein the high voltage line is disposed inside the vehicle body compared with the signal line.

* * * * *